(12) United States Patent
Suzuki

(10) Patent No.: US 9,207,508 B2
(45) Date of Patent: Dec. 8, 2015

(54) TFT ARRAY SUBSTRATE AND MANUFACTURING METHOD THEREOF, AND DISPLAY APPARATUS

(71) Applicant: BOE TECHNOLOGY GROUP CO., LTD., Beijing (CN)

(72) Inventor: Teruaki Suzuki, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 160 days.

(21) Appl. No.: 13/703,854

(22) PCT Filed: Oct. 31, 2012

(86) PCT No.: PCT/CN2012/083885
§ 371 (c)(1),
(2) Date: Dec. 12, 2012

(87) PCT Pub. No.: WO2013/086906
PCT Pub. Date: Jun. 20, 2013

(65) Prior Publication Data
US 2014/0078438 A1 Mar. 20, 2014

(30) Foreign Application Priority Data
Dec. 15, 2011 (CN) .......................... 2011 1 0421002

(51) Int. Cl.
*G02F 1/1343* (2006.01)
*G02F 1/1362* (2006.01)
*G02F 1/1337* (2006.01)

(52) U.S. Cl.
CPC .... *G02F 1/136277* (2013.01); *G02F 1/134363* (2013.01); *G02F 1/133707* (2013.01); *G02F 2001/13373* (2013.10); *G02F 2001/134318* (2013.01); *G02F 2001/134372* (2013.01)

(58) Field of Classification Search
CPC ................... G02F 1/134363; G02F 1/133707; G02F 2001/134318; G02F 2001/134372
USPC ....................................................... 349/141
See application file for complete search history.

(56) References Cited

U.S. PATENT DOCUMENTS

| | | | |
|---|---|---|---|
| 8,189,158 B1 | 5/2012 | Kuo et al. | |
| 2008/0088785 A1 | 4/2008 | Segawa et al. | |

(Continued)

FOREIGN PATENT DOCUMENTS

| | | | |
|---|---|---|---|
| CN | 100658073 B1 | 12/2006 | |
| CN | 101075054 A | 11/2007 | |

(Continued)

OTHER PUBLICATIONS

International Search Report mailed Jul. 2, 2013; PCT/CN2012/083885.

(Continued)

*Primary Examiner* — Michael Caley
(74) *Attorney, Agent, or Firm* — Ladsa & Parry LLP

(57) ABSTRACT

Embodiments of the present invention provide a TFT array substrate and a manufacturing method thereof, and a display apparatus. The TFT array substrate comprises upper and lower layer electrodes insulating from each other, wherein the upper layer electrode has slits, the slits comprising at least one pair of angles of less than or equal to 90°; the lower layer electrode is a whole-plane electrode. The lower layer electrode has absent regions, and each of the absent regions corresponds to the corresponding angle of less than or equal to 90° of the slits of the upper layer electrode.

10 Claims, 5 Drawing Sheets

(56) References Cited

U.S. PATENT DOCUMENTS

| | | |
|---|---|---|
| 2009/0009672 A1 | 1/2009 | Chung et al. |
| 2009/0128727 A1 | 5/2009 | Yata |
| 2009/0201451 A1* | 8/2009 | Kurasawa et al. ............ 349/126 |
| 2010/0134710 A1* | 6/2010 | Ishitani et al. .................. 349/46 |
| 2012/0188496 A1* | 7/2012 | Nomura et al. ............... 349/123 |

FOREIGN PATENT DOCUMENTS

| | | |
|---|---|---|
| CN | 101162315 A | 4/2008 |
| CN | 101441369 A | 5/2009 |
| CN | 101614915 A | 12/2009 |
| CN | 102629038 A | 8/2012 |
| CN | 102902114 A | 1/2013 |
| KR | 20110066491 A | 6/2011 |

OTHER PUBLICATIONS

First Chinese Office Action dated Dec. 24, 2013; Appln. No. 201110421002.4.

International Preliminary Report on Patentabiity dated Jun. 17, 2014; PCT/CN2012/083885.

* cited by examiner

TFT ARRAY SUBSTRATE AND MANUFACTURING METHOD THEREOF, AND DISPLAY APPARATUS

BACKGROUND

Embodiments of the present invention relate to a TFT array substrate and a manufacturing method thereof, and a display apparatus.

Thin film transistor liquid crystal displays (TFT-LCDs) have the characteristics of small volume, low power consumption, no radiation, etc., and occupy a dominant position in the current flat panel display market.

In Advanced Super Dimension Switch (ADSDS, or ADS) technology, a electric field generated by fringes of slit electrodes in the same plane and a electric field generated between the slit electrode layer and the plate electrode layer can constitute a multi-dimension electric field, so as to make liquid crystal molecules oriented in all directions between the slits electrodes and directly above the electrodes inside a liquid crystal cell capable of rotating, thus improving the operating efficiency of liquid crystals and increasing the light transmittance. The ADS technology can improve the displaying quality of a TFT-LCD, and has advantages of high resolution, high transmittance, low power consumption, wide viewing angle, high aperture ratio, low chromatic aberration, no push Mura, etc.

Generally, as shown in FIG. 1, on an array substrate of a ADS mode, there are two layers of upper and lower electrodes insulating from each other, wherein the upper layer electrode 1 has slits, in other words, it is formed as a slit electrode, and the lower layer electrode 2 is formed as a whole plane, i.e., a plate electrode, a multi-dimension electric field generates between the upper and lower electrodes to make the liquid crystals rotate. However, in a corner region A with an angle of ≤90° of the slit of the upper layer electrode 1, due to the electric field, a portion of the liquid crystal molecules in this region may rotate reversely, that is, it forms a reverse rotation domain. The light transmittance of the liquid crystals in this region is lower than that of the liquid crystals in the forward rotation region, thus disclination lines are generated on the border region between the reverse rotation region and the forward rotation region, so that the light transmittance on the border region is very low, the border region is substantially black. In order to eliminate the above bad influence, a shape of the slits of the upper layer electrode 1 of the TFT substrate has been improved, and sharp angle processing has been performed on two ends of the original slits. The processed slits have a shape of crab leg, as shown in FIG. 2. However, the improved TFT substrate does not have an obvious effect on preventing reverse rotation domain of the liquid crystals and disclination lines from generating at the corner of the slits, and unable to obviously improve the light transmittance in such region.

SUMMARY

Embodiments of the present invention provide a TFT array substrate and a manufacturing method thereof, and a display apparatus, which prevent a reverse rotation domain of liquid crystals and a disclination line from generating at the corner of the slit electrode, and improve the light transmittance in such region.

An embodiment of the present invention provides a TFT array substrate, comprising upper and lower layer electrodes insulating from each other, wherein the upper layer electrode has slits, the slits comprising at least one pair of angles of less than or equal to 90°; the lower layer electrode is a whole-plane electrode.

The lower layer electrode has absent regions, and each of the absent regions corresponds to the corresponding angle of less than or equal to 90° of the slits of the upper layer electrode.

Another embodiment of the present invention provides a display apparatus, comprising the above TFT array substrate.

Yet another embodiment of the present invention provides a method of manufacturing a TFT array substrate, comprising: forming gate lines, gates and a lower layer electrode on a base substrate, wherein absent regions are formed in the lower layer electrode while limning the lower layer electrode on the base substrate by a patterning process; forming a gate insulation layer on the gate lines, the gates and the lower layer electrode and the base substrate; forming a semiconductor active layer on the gate insulation layer; forming data lines, sources and drains on the base substrate; forming a passivation layer on the data lines, the sources, the drains, and the lower layer electrode; forming an upper layer electrode having slits on the passivation layer, wherein the slits comprising at least one pair of angles of less than or equal to 90°, and each of the absent regions of the lower layer electrode corresponds to the corresponding angle of less than or equal to 90° of the slits of the upper layer electrode; and forming a protection layer on the upper layer electrode.

The TFT array substrate and the manufacturing method thereof and display apparatus provided by any embodiment of the present invention, comprising upper layer and lower layer electrodes, wherein the upper layer electrode has slits, the slits comprising at least one pair of angles of less than or equal to 90°; the lower layer electrode is a whole-plane electrode, and the lower layer electrode has absent regions, and each of the absent regions corresponds to the corresponding angle of less than or equal to 90° of the slits of the upper layer electrode. Thus, at a region where the angle of less than or equal to 90° of the slits of the upper layer electrode is located, since there is no corresponding lower layer electrode under the region, the electric field at the region is weakened, thus a portion of the liquid crystal molecules in the region is less likely to form a reverse rotation domain, so it is not possible to generate a relatively obvious disclination line, and the light transmittance of the region is improved.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Figure 1:
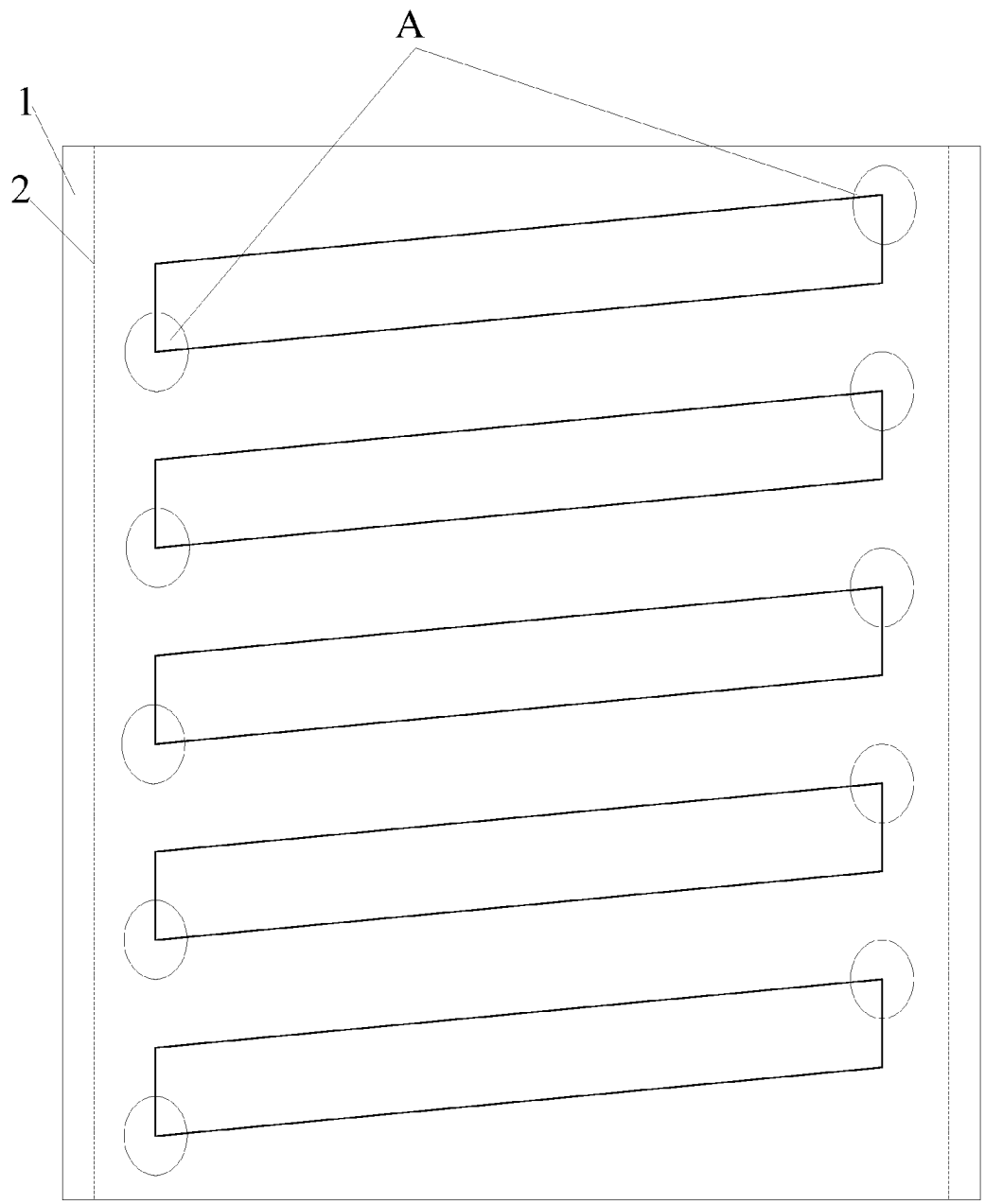
FIG. 1 is a first schematic view of an electrode structure of a TFT array substrate in an ADS mode in the prior art.
Figure 2:
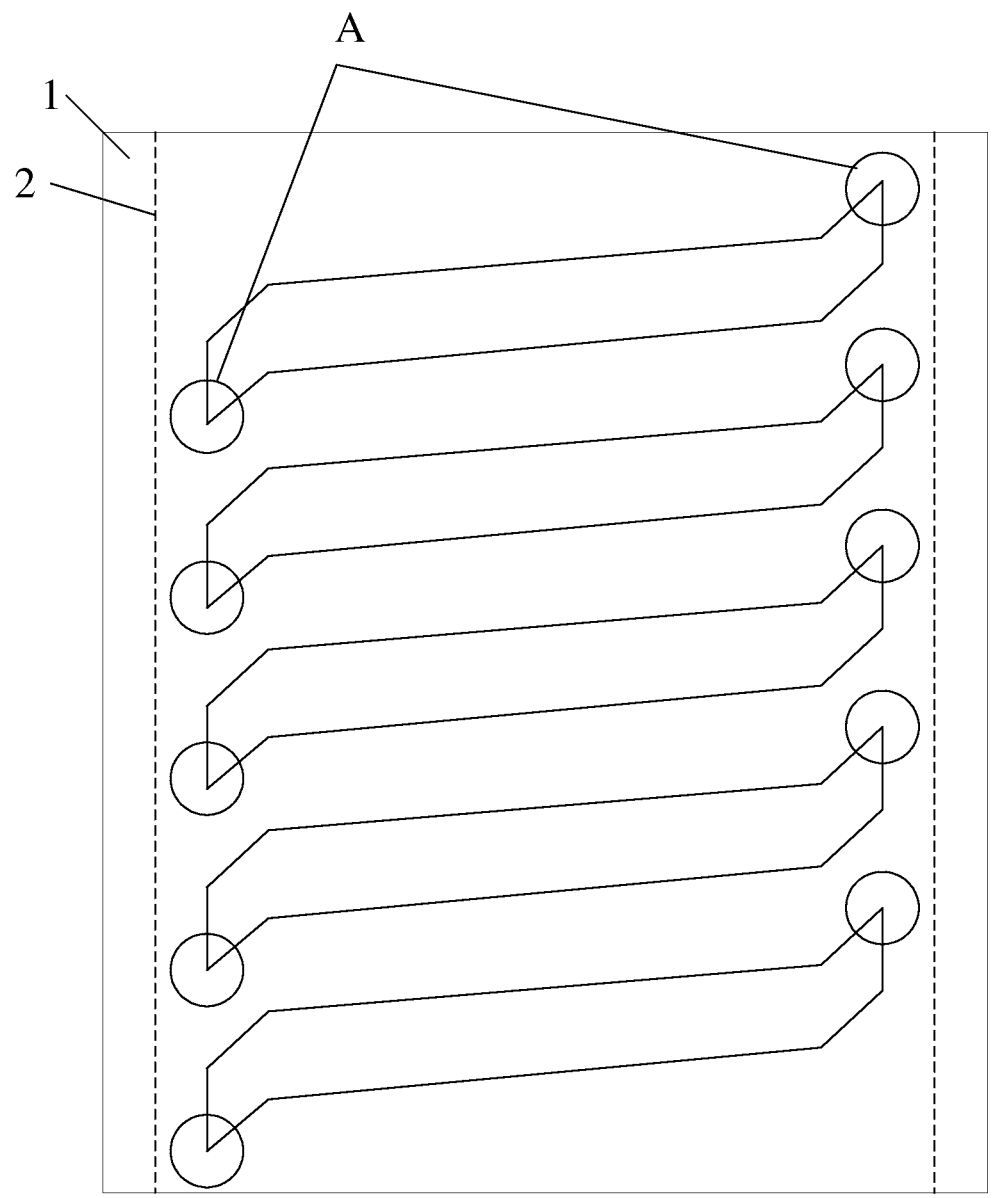
FIG. 2 is a second schematic view of an electrode structure of a TFT array substrate in an ADS mode in the prior art.
Figure 3:
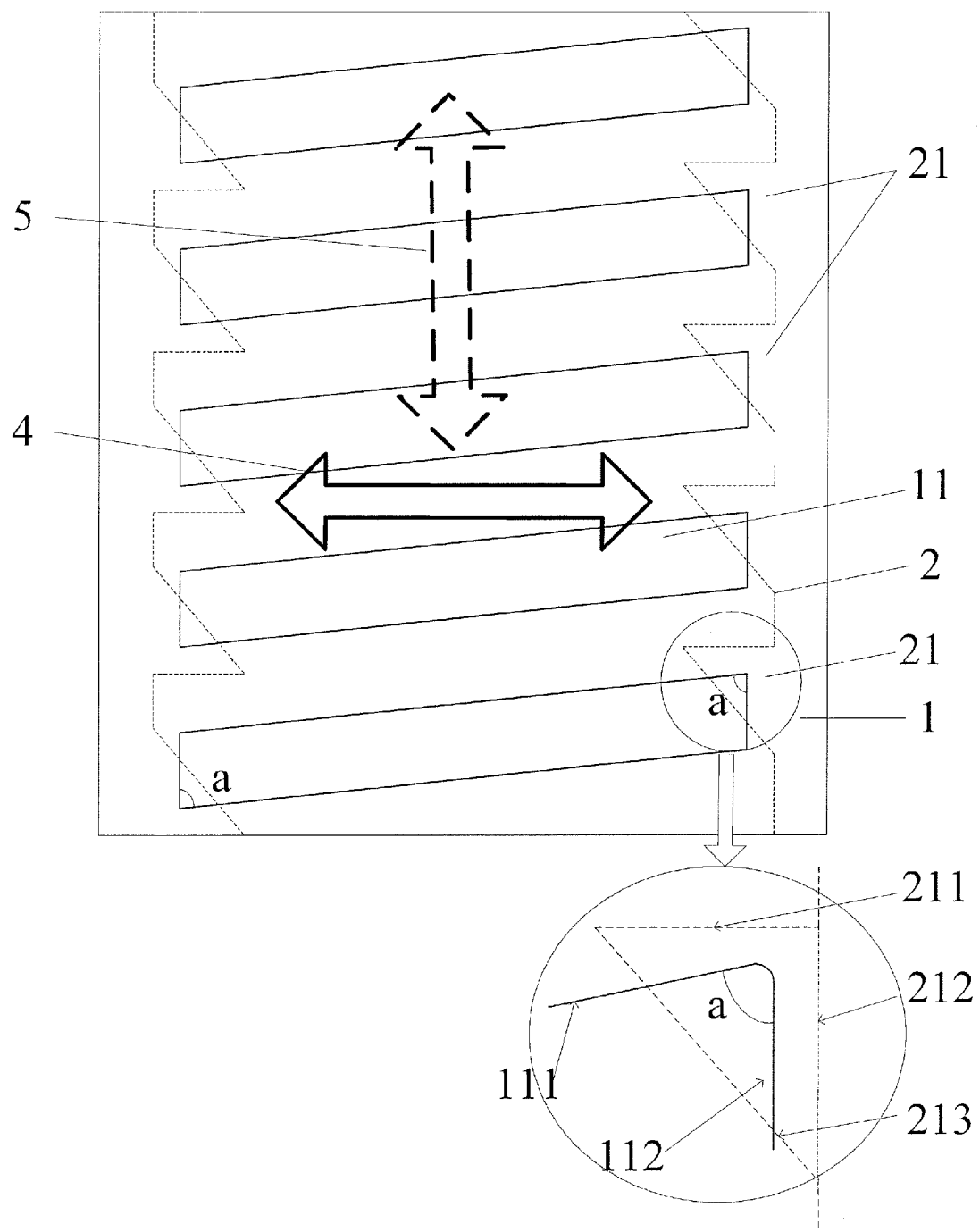
FIG. 3 is a schematic view of an electrode structure of a TFT array substrate in a ADS mode provided by an embodiment of the present invention.

As shown in FIG. 3, a TFT array substrate in an ADS mode provided by an embodiment of the present invention comprises: an upper layer electrode 1 having slits 11 and a whole-plane lower layer electrode 2, and there is at least an insulation layer formed between the upper layer electrode 1 and the lower layer electrode 2. The slits 11 of the upper layer electrode 1 are parallelogram in shape, and comprises at least one pair of angles □α of less than or equal to 90 degree)(≤90°. In the present embodiment, the top end of the angle ∠α may be rounded. The lower layer electrode 2 has absent region 21, and each of the absent regions 21 corresponds to the corresponding angle ∠α of the slits 11 of the upper layer electrode 1.

Referring to FIG. 3, a circle at the lower part of FIG. 3 schematically illustrates an angle ∠α of ≤90° of the slits 11 of the upper layer electrode 1. Taking one absent region as an example, the absent region 21 of the lower layer electrode 2 may be of triangle, wherein an edge 211 of the triangle is far away from an edge 111 of the angle ∠α, an edge 212 of the triangle is far away from an edge 112 of the angle ∠α, and another edge 213 of the triangle overlaps with the edges 111 and 112 of the angle ∠α. Thus, the absent region 21 of the lower layer electrode 2 corresponds to the angle ∠α of ≤90° of the slits 11 of the upper layer electrode 1. Accordingly, at a region where an angle of less than or equal to 90° of the slits of the upper layer electrode is located, since there is not a corresponding lower layer electrode existing under the region, thus a portion of the liquid crystal molecules in the region is less likely to form a reverse rotation domain, so it is not possible to generate a relatively obvious disclination line, and the light transmittance of the region is improved.

On the TFT array substrate in the ADS mode provided by the present embodiment, when positive liquid crystals are used, liquid crystal molecules may be initially aligned in a horizontal direction (left and right direction in FIG. 3), as denoted by a solid line arrow 4 of FIG. 3, that is, an initial alignment direction; when negative liquid crystals are used, the liquid crystal molecules may be initially aligned in a vertical direction (upper and lower direction in FIG. 3), as denoted by a dotted line arrow 5 of FIG. 3, that is, an initial alignment direction.

Figure 4:
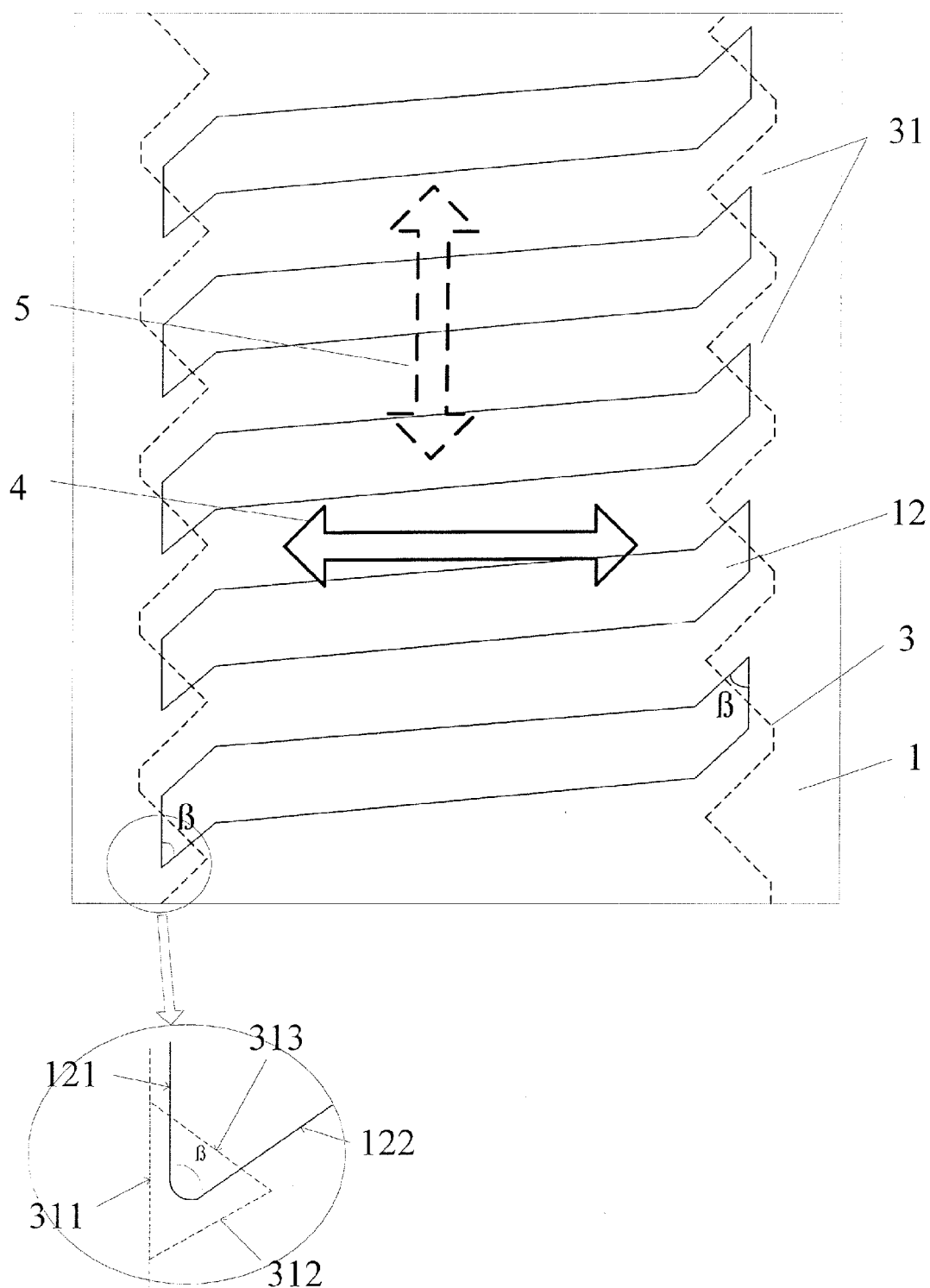
FIG. 4 is a schematic view of an electrode structure of a TFT array substrate in an ADS mode provided by another embodiment of the present invention.

As shown in FIG. 4, a TFT array substrate in an ADS mode provided by another embodiment of the present invention comprises: an upper layer electrode 1 having slits 12 and a whole-plane lower layer electrode 3, and there is at least an insulation layer formed between the upper layer electrode 1 and the lower layer electrode 3. The slits 12 of the upper layer electrode 1 are of crab-leg shape, and comprises at least one pair of angles ∠β of ≤90°. In the present embodiment, the top end of the angle ∠β may be rounded. The lower layer electrode layer 3 has absent regions 31, and each of the absent regions 31 corresponds to the corresponding angle ∠β of ≤90° of the slits 12 of the upper layer electrode 1.

Referring to FIG. 4, a circle at the lower part of FIG. 4 schematically illustrates an angle ∠β of ≤90° of the slits of the upper layer electrode 1. Taking one absent region as an example, the absent region 31 of the lower layer electrode 3 may be of triangle, wherein an edge 311 of the triangle is far away from an edge 121 of the angle ∠β, an edge 312 of the triangle is far away from an edge 122 of the angle ∠β, and another edge 313 of the triangle overlaps with the edges 121 and 122 of the angle ∠β. Thus, each of the absent regions 31 of the lower layer electrode 3 corresponds to the corresponding angle ∠β of ≤90° of the slits 12 of the upper layer electrode 1.

Accordingly, at a region where the angle ∠β≤90° of the slits of the upper layer electrode is located, since there is not a corresponding lower layer electrode existing under the region, thus a portion of the liquid crystal molecules in the region is less likely to form a reverse rotation domain, so it is not possible to generate a relatively obvious disclination line, and the light transmittance of the region is improved.

Similarly, on the TFT array substrate in the ADS mode provided by the present embodiment, when positive liquid crystals are used, the liquid crystal molecules may be aligned in a horizontal direction (left and right direction in FIG. 4), as shown by the solid line arrow 4 of FIG. 4; when negative liquid crystals are used, the liquid crystal molecules may be aligned in a vertical direction (upper and lower direction in FIG. 4), as shown by the dotted line arrow 5 of FIG. 4.

Figure 5:
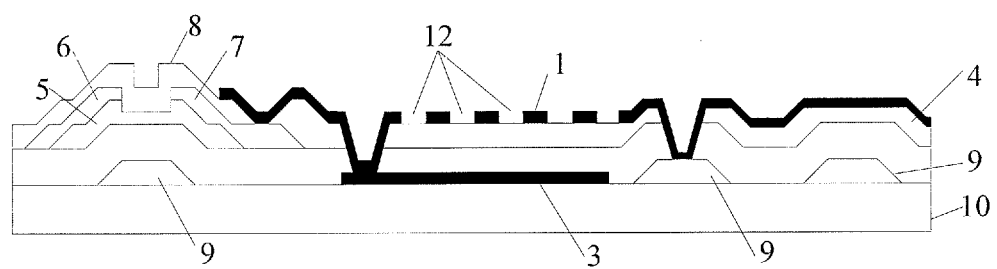
FIG. 5 is a cross section view of a TFT array substrate in an ADS mode provided by an embodiment of the present invention.

FIG. 5 is a cross-section view of the above array substrate. The array substrate comprises a base substrate 10, an upper layer electrode 1 having slits 12, a whole-plane lower layer electrode 3 having absent regions 31, gates 9, a gate insulation layer 4, an active layer 5, drains 6, sources 7, and a passivation layer 8.

In an alternative embodiment, the slits of the upper layer electrode 1 may have other shapes, and the absent regions of the lower layer electrode may also have other shapes, as long as each of the absent regions of the lower layer electrode corresponds to the corresponding angle of ≤90° of the slits of the upper layer electrode so that there is no corresponding lower layer electrode under the region where the angle of ≤90° is located.

The TFT array substrate in the ADS mode provided by any embodiment of the present invention comprises upper layer and lower layer electrodes insulating from each other, wherein the upper layer electrode has slits, the slits comprising at least one pair of angles of less than or equal to 90°; the lower layer electrode is a whole-plane electrode, and the lower layer electrode has absent regions, and each of the absent regions corresponds to the corresponding angle of less than or equal to 90° of the slits of the upper layer electrode. Thus, at a region where the angle of less than or equal to 90° of the slits of the upper layer electrode is located, since there is no corresponding lower layer electrode under the region, the electric field at the region is weakened, thus a portion of the liquid crystal molecules in the region is less likely to form a reverse rotation domain, so it is not possible to generate a relatively obvious disclination line, and the light transmittance of the region is improved.

Yet another embodiment of the present invention provides a method of manufacturing a TFT array substrate in an ADS mode, comprising:

S601: forming gate lines, gates and a lower layer electrode on a base substrate, wherein absent regions are formed in the lower layer electrode while forming the lower layer electrode on the base substrate by a patterning process;

S602: forming a gate insulation layer on the gate lines, the gates and the lower layer electrode and the base substrate;

S603: forming a semiconductor active layer on the gate insulation layer;

S604: fainting data lines, sources and drains on the base substrate;

S605: forming a passivation layer on the data lines, the sources, and the drains;

S606: forming an upper layer electrode having slits on the passivation layer, wherein the slits comprising at least one pair of angles of less than or equal to 90°, top ends of the angles of less than or equal to 90° may be rounded, and each of the absent regions of the lower layer electrode corresponds to the corresponding angle of less than or equal to 90° of the slits of the upper layer electrode; and S607: forming a protection layer on the upper layer electrode.

As an example, the slits of the upper layer electrode may be of parallelogram shape, crab-leg shape, or the like. The absent regions of the lower layer electrode may be of triangle or the like, wherein two edges of the triangle are respectively far away from two corresponding edges of the angle of less than or equal to 90° of the slits of the upper layer electrode, and another edge of the triangle overlaps with the two edges of the angle of less than or equal to 90° of the slits of the upper layer electrode, so that each of the absent regions of the lower layer electrode corresponds to the corresponding angle of less than or equal to 90° of the slits of the upper layer electrode. Thus, there is not a corresponding overlapping occurring between a region where the angle of less than or equal to 90° of the slits of the upper layer electrode is located and the lower layer electrode in the vertical direction, the electric field at the region is weakened, thus a portion of the liquid crystal molecules in the region is less likely to form a reverse rotation domain, so it is not possible to generate a relatively obvious disclination line, and the light transmittance of the region is improved.

In the method of manufacturing the TFT array substrate in the ADS mode provided by the embodiment of the present invention, slits are formed in the upper layer electrode on the substrate, and the slits comprise at least one pair of angles of less than or equal to 90°; the lower layer electrode is a whole-plane electrode, and absent regions are formed in the lower layer electrode, and each of the absent regions corresponds to the corresponding angle of less than or equal to 90° of the slits of the upper layer electrode. Thus, at a region where an angle of less than or equal to 90° of the slits of the upper layer electrode is located, there is not a corresponding lower layer electrode existing under the region, the electric field at the region is weakened, thus a portion of the liquid crystal molecules in the region is less likely to form a reverse rotation domain, so it is not possible to generate a relatively obvious disclination line, and the light transmittance of the region is improved.

Yet another embodiment of the present invention further provides a display apparatus comprising a TFT array substrate provided by any of the above embodiments, and a structure of the array substrate is the same as that of the array substrate of the any above embodiment, so a repeated description is omitted.

One example of the display apparatus is a liquid crystal display apparatus, such as a liquid crystal panel, a liquid crystal television, a mobile phone, a liquid crystal display, etc., wherein the TFT array substrate and an opposite substrate are disposed to face each other to form a liquid crystal cell, and a liquid crystal material is filled in the liquid crystal cell. The opposite substrate is a color filter substrate, for example. The pixel electrode of each pixel unit of the TFT array substrate is used to apply an electric field, so as to control a rotation of the liquid crystal material and to perform a displaying operation. In some examples, the liquid crystal display apparatus further comprises a backlight source provided for the array substrate.

Another example of the display apparatus is an organic light emitting display (OLED) apparatus, wherein a pixel electrode of each pixel unit of the TFT array substrate is used as an anode or a cathode to drive an organic light-emitting material to emit light so as to perform a displaying operation.

In addition to the liquid crystal display apparatus and the organic light emitting display apparatus, the above display apparatus may further be other display apparatuses, such as an electron reader, which does not comprise a color filter substrate, but comprises the array substrate in the above embodiments.

The forgoing are only particular embodiments of the present invention, however, the protection scope of the present invention is not limited thereto. Any change or substitution, which can be easily conceived by those skilled in the art within the technical scope disclosed by the present invention, should be covered within the protection scope of the present invention. Thus, the protection scope of the present invention is only defined by the claims.

What is claimed is:

1. A TFT array substrate, comprising upper and lower layer electrodes insulating from each other,
    wherein the upper layer electrode includes slits, each of the slits comprising:
        a main body portion having a parallelogram shape; and
        two bend-portions extending from two short-sides of the main body, the two bend-portions each having a same included angle with a corresponding long side of the parallelogram, wherein each bend-portion includes at least one angle of less than 90°;
    wherein the lower layer electrode is a whole-plane electrode, and
    wherein the lower layer electrode has absent regions, and each of the absent regions directly and only corresponds to the corresponding angle of less than 90° of the bend-portions of the slits of the upper layer electrode,
    wherein each of the absent regions only overlaps the corresponding angle of less than 90° of the bend-portions of the slits of the upper layer electrode, and each of the absent regions is only positioned directly below the corresponding angle of less than 90° of the bend-portions of the slits of the upper layer electrode.

2. The TFT array substrate according to claim 1, wherein each of the absent regions of the lower layer electrode is of triangle, wherein two edges of the triangle are respectively far away from two corresponding edges of the angle of less than 90° of the bend-portions of the slits of the upper layer electrode, and another edge of the triangle overlaps with the two corresponding edges of the angle of less than 90° of the bend-portions of the slits of the upper layer electrode, so that each of the absent regions of the lower layer electrode corresponds to the corresponding angle of less than 90° of the bend-portions of the slits of the upper layer electrode.

3. The TFT array substrate according to claim 1, wherein a top end of each of the angles of less than 90° is rounded.

4. A display apparatus, comprising:
    a TFT array substrate, comprising upper and lower layer electrodes insulating from each other,
    wherein the upper layer electrode includes slits, each of the slits comprising:
        a main body portion having a parallelogram shape; and
        two bend-portions extending from two short-sides of the main body, the two bend-portions each having a same included angle with a corresponding long side of the parallelogram, wherein each bend-portion includes at least one angle of less than 90°;

wherein the lower layer electrode is a whole-plane electrode, and the lower layer electrode has absent regions, and each of the absent regions directly and only corresponds to the corresponding angle of less than 90° of the bend-portions of the slits of the upper layer electrode, wherein each of the absent regions only overlaps the corresponding angle of less than 90° of the bend-portions of the slits of the upper layer electrode, and each of the absent regions is only positioned directly below the corresponding angle of less than 90° of the bend-portions of the slits of the upper layer electrode.

5. The display apparatus according to claim 4, wherein each of the absent regions of the lower layer electrode is of triangle, wherein two edges of the triangle are respectively far away from two corresponding edges of the angle of less than 90° of the bend-portions of the slits of the upper layer electrode, and another edge of the triangle overlaps with the two corresponding edges of the angle of less than 90° of the bend-portions of the slits of the upper layer electrode, so that each of the absent regions of the lower layer electrode corresponds to the corresponding angle of less than 90° of the bend-portions of the slits of the upper layer electrode.

6. The display apparatus according to claim 4, wherein a top end of each of the angles of less than 90° is rounded.

7. The display apparatus according to claim 4, further comprising:
an opposite substrate, disposed to be opposite to the array substrate to form a liquid crystal cell; and
liquid crystal material, filled in the liquid crystal cell.

8. A method of manufacturing a TFT array substrate, comprising:
forming gate lines, gates and a lower layer electrode on a base substrate, wherein absent regions are formed in the lower layer electrode while forming the lower layer electrode on the base substrate by a patterning process;
forming a gate insulation layer on the gate lines, the gates and the lower layer electrode and the base substrate;
forming a semiconductor active layer on the gate insulation layer;
forming data lines, sources and drains on the base substrate;
forming a passivation layer on the data lines, the sources, the drains, and the lower layer electrode;
forming an upper layer electrode including slits on the passivation layer, wherein each of the slits comprises:
a main body portion having a parallelogram shape; and
two bend-portions extending from two short-sides of the main body, the two bend-portions each having a same included angle with a corresponding long side of the parallelogram, wherein each bend-portion includes at least one angle of less than 90°; and
wherein each of the absent regions of the lower layer electrode directly and only corresponds to the corresponding angle of less than 90° of the bend-portions of the slits of the upper layer electrode; and
forming a protection layer on the upper layer electrode,
wherein each of the absent regions only overlaps the corresponding angle of less than 90° of the bend-portions of the slits of the upper layer electrode, and each of the absent regions is only positioned directly below the corresponding angle of less than 90° of the bend-portions of the slits of the upper layer electrode.

9. The method according to claim 8, wherein each of the absent regions of the lower layer electrode is of triangle, wherein two edges of the triangle are respectively far away from two corresponding edges of the angle of less than 90° of the bend-portions of the slits of the upper layer electrode, and another edge of the triangle overlaps with the two corresponding edges of the angle of less than 90° of the bend-portions of the slits of the upper layer electrode, so that each of the absent regions of the lower layer electrode corresponds to the corresponding angle of less than 90° of the bend-portions of the slits of the upper layer electrode.

10. The method according to claim 8, wherein a top end of each of the angles of less than 90° is rounded.

* * * * *